(12) United States Patent
den Dulk

(10) Patent No.: US 11,330,763 B1
(45) Date of Patent: May 17, 2022

(54) NUT HARVESTING EQUIPMENT

(71) Applicant: Arthur Frank den Dulk, Hughson, CA (US)

(72) Inventor: Arthur Frank den Dulk, Hughson, CA (US)

( * ) Notice: Subject to any disclaimer, the term of this patent is extended or adjusted under 35 U.S.C. 154(b) by 207 days.

(21) Appl. No.: 16/778,287

(22) Filed: Jan. 31, 2020

(51) Int. Cl.
*A01D 51/00* (2006.01)

(52) U.S. Cl.
CPC ........... *A01D 51/002* (2013.01); *A01D 51/00* (2013.01)

(58) Field of Classification Search
CPC ...... A01D 51/00; A01D 51/002; A01D 46/26; A01B 31/00; A01B 43/00; A01B 43/005; E02F 3/76–7695; E01C 2301/06
See application file for complete search history.

(56) References Cited

U.S. PATENT DOCUMENTS

| | | | | | |
|---|---|---|---|---|---|
| 2,725,700 | A | * | 12/1955 | Fahrenholz | A01B 43/00 171/12 |
| 2,816,614 | A | * | 12/1957 | Hier | A01B 43/005 171/63 |
| 3,479,755 | A | * | 11/1969 | Schropp | E02F 3/6481 37/422 |
| 3,520,727 | A | * | 7/1970 | Crump | A63B 47/021 134/115 R |
| 3,566,893 | A | * | 3/1971 | Richardson | A63B 47/021 134/115 R |
| 3,587,814 | A | * | 6/1971 | Garabedian | A01D 51/00 198/309 |
| 3,698,169 | A | * | 10/1972 | Simpson | A01D 51/002 56/328.1 |
| 4,878,802 | A | * | 11/1989 | Hansen | A01D 51/00 414/523 |
| 5,697,731 | A | * | 12/1997 | Bonds | E01C 19/00 172/815 |
| 6,139,223 | A | * | 10/2000 | Snyder | A01C 5/066 172/509 |
| 7,028,460 | B1 | * | 4/2006 | Fahrenholz | A01B 43/005 171/63 |
| 9,398,742 | B2 | * | 7/2016 | McIlhatton | A01D 51/002 |
| 2015/0068186 | A1 | * | 3/2015 | McIlhatton | A01D 51/002 56/328.1 |
| 2016/0345495 | A1 | * | 12/2016 | Russell | A01D 51/002 |
| 2018/0206405 | A1 | * | 7/2018 | McIlhatton | A01D 46/26 |

FOREIGN PATENT DOCUMENTS

| CA | 985912 | A | * | 3/1976 | ............ A01D 51/00 |
|---|---|---|---|---|---|
| CN | 107409637 | A | * | 12/2017 | |

* cited by examiner

*Primary Examiner* — Adam J Behrens
(74) *Attorney, Agent, or Firm* — Plager Schack LLP; Mark H. Plager; Kara Verryt

(57) ABSTRACT

A harvesting machine designed to push ends of nut rows in after sweeping may include a bottomless basket removably attached to a ridable device, and a linear actuator operatively attached to the bottomless basket. The basket may include a back wall; a first side wall and a second side wall attached to and extending from the back wall at an angle such that first ends of each side wall attached to the back wall are closer together than second ends of each side wall positioned distal from the back wall; and a cross support attached to and extending between the second ends of the side walls. Each of the back wall and the side walls may have slotted sides and skid shoes attached to a bottom surface thereof.

8 Claims, 6 Drawing Sheets

NUT HARVESTING EQUIPMENT

BACKGROUND

The embodiments described herein relate generally to harvesting equipment, and more particularly, to nut harvesting equipment designed to removably engage with a riding lawn mower, all-terrain vehicle (ATV), utility terrain vehicle (UTV), or the like, wherein the equipment pushes the ends of nut rows in after sweeping.

Almond ranchers struggle to employ individuals to manually rake in the ends of the rows of nuts so that harvesting equipment are able to easily pick up the nuts. This job is a long and tedious process and requires many hours of labor to be done by multiple people or large, bulky equipment. Existing devices are large, pull behind devices that require the use of full-sized equipment and are not easily transportable to and from multiple locations. Because of the sheer size of existing devices, they can damage nuts on the ground.

Therefore, what is needed is a compact and maneuverable device for raking in the ends of nut rows, wherein the device is designed to removably engage with a tractor, riding lawn mower, ATV, UTV or the like.

SUMMARY

Some embodiments of the present disclosure include a harvesting machine designed to push ends of nut rows in after sweeping may include a bottomless basket removably attached to a ridable device, and a linear actuator operatively attached to the bottomless basket. The basket may include a back wall; a first side wall and a second side wall attached to and extending from the back wall at an angle such that first ends of each side wall attached to the back wall are closer together than second ends of each side wall positioned distal from the back wall; and a cross support attached to and extending between the second ends of the side walls. Each of the back wall and the side walls may have slotted sides and skid shoes attached to a bottom surface thereof.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

Figure 1:
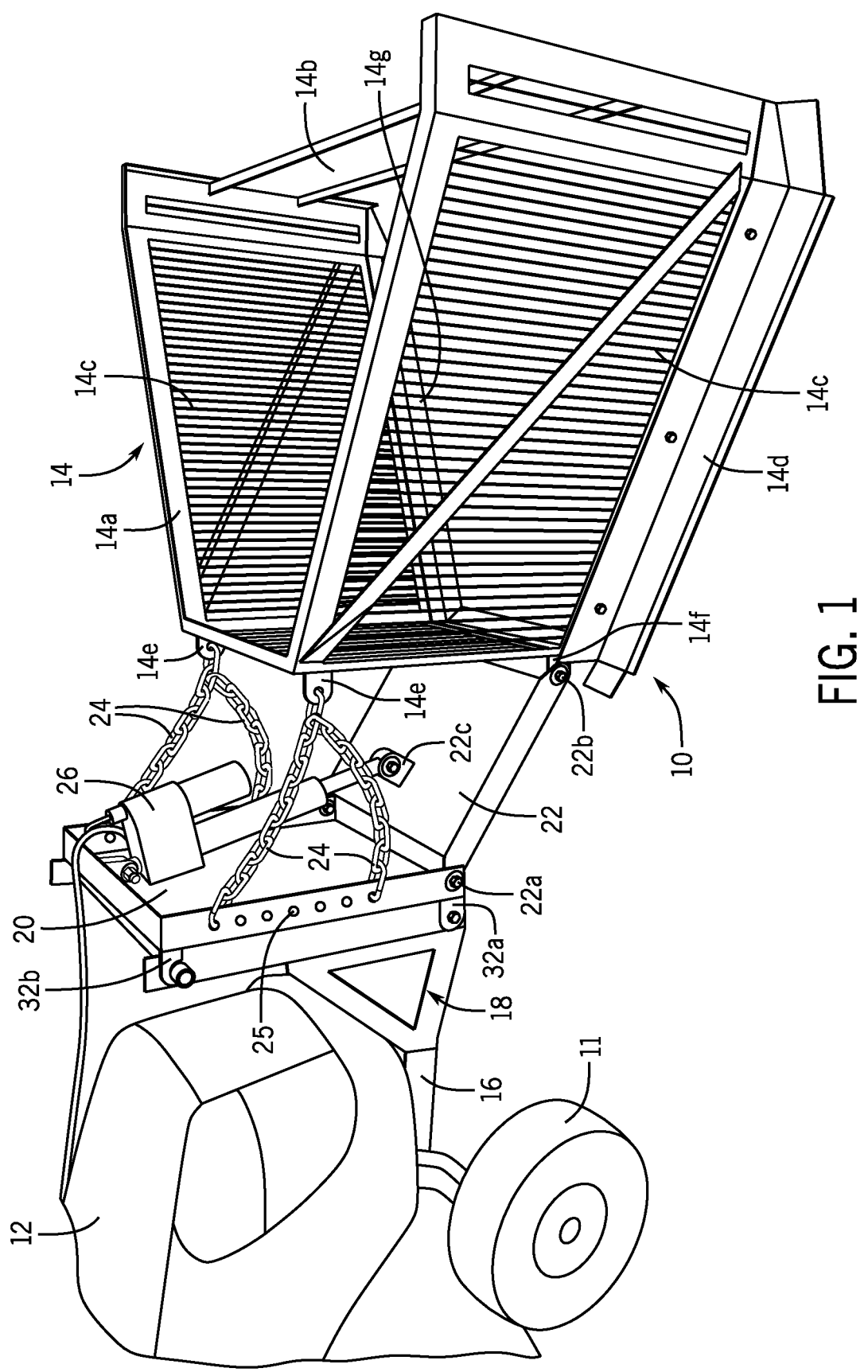
FIG. 1 is a perspective view of one embodiment of the present disclosure, shown in use.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as harvesting equipment to rake in the ends of nut rows and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements and the following examples are presented as illustrative examples only.

By way of example, and referring to FIGS. 1-5, some embodiments of the invention include a harvesting machine 10 to push ends of nut rows in after sweeping, the machine 10 comprising a bottomless basket 14 removably attached to a ridable device, such as a riding lawn mower, all-terrain vehicle (ATV), utility terrain vehicle (UTV), or the like, wherein a linear actuator 26 is operatively attached to the basket 14 to lift the basket 14 up and down off of a ground surface.

More specifically, as shown in the Figures, the basket 14 may comprise a frame 14a comprising a back wall and two side walls angled away from each other and extending from the edges of the back wall, such that ends of the side walls attached to the back wall are closer together than ends of the side walls distal from the back wall. A cross support 14b may attach the distal ends of the side walls to one another, wherein the cross support 14b may be attached to the distal ends such that it is spaced vertically above the ground when the basket 14 is sitting on the ground. For example, the cross support 14b may be positioned at a substantially central height of the distal ends of the sidewalls. Outer bottom edges (i.e., edges designed to be positioned against the ground when the basket 14 is not lifted and away from the interior of the basket 14) of the back wall and each side wall may have a skid shoe 14d attached thereto. Interior bottom edges of the back wall and each side wall may have an inside scraper 14g attached thereto. The skid shoes 14d and inside scrapers 14g may be removably attached to the walls, such that they may be replaceable over time. The skid shoes 14d may allow the basket 14 to slide on the ground during use, while the inside scraper 14g may scrape the nuts. As shown in the figures, each of the side walls and the back wall of the basket 14 may comprise slotted sides 14c, wherein the slotted sides 14c may allow dirt/sand to pass through, reducing the amount of dirt/sand that piles up with the nuts. The side walls may also each include a side support extending across a length thereof, such as at an angle from a top corner proximate to the back wall down to a bottom corner distal from the back wall.

Figure 2:
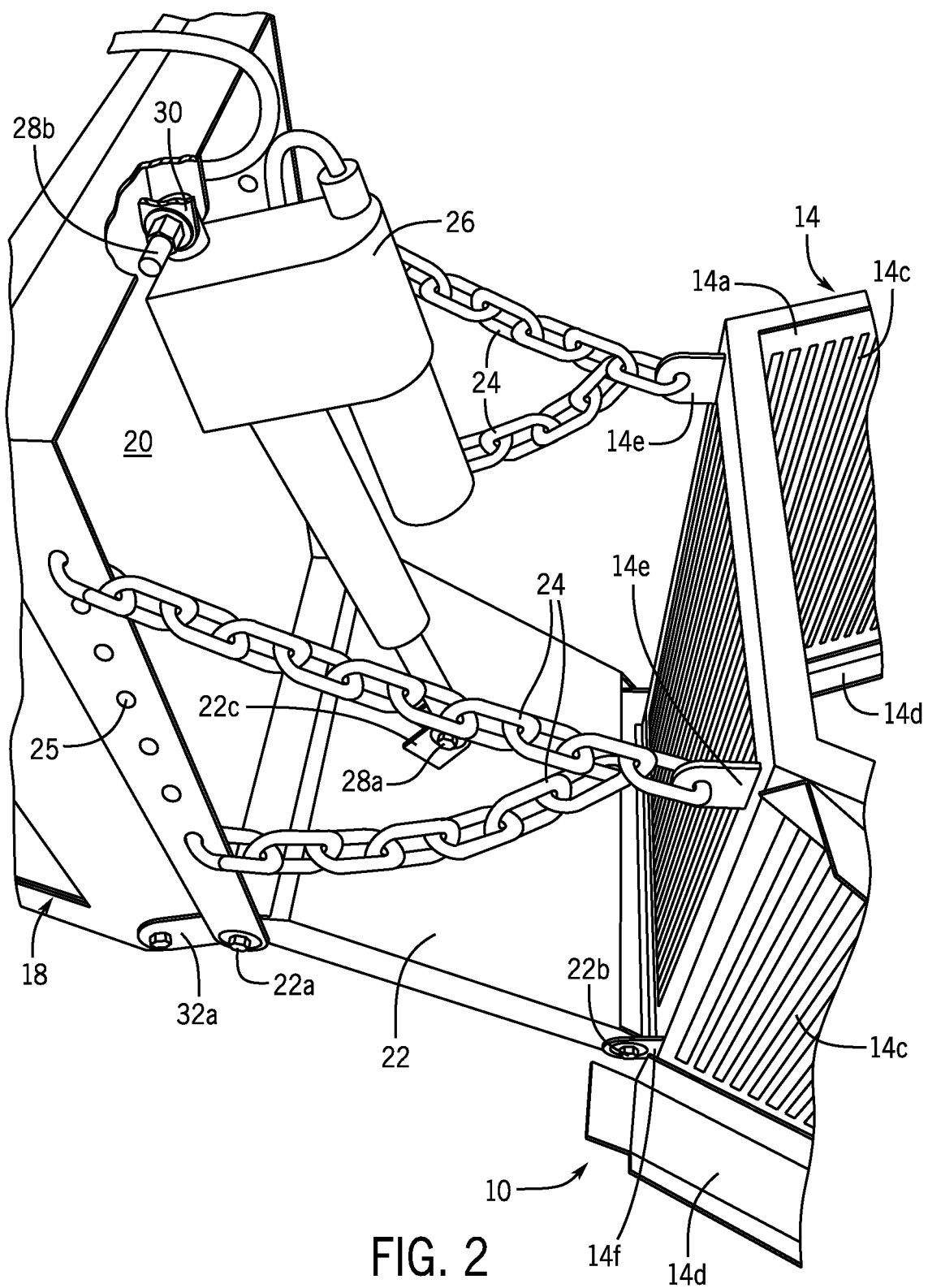
FIG. 2 is a detail perspective view of one embodiment of the present disclosure.

An outer surface of the back wall (i.e., the surface of the back wall opposite the side walls) may comprise a plurality of tabs extending therefrom. As shown in FIG. 2, for example, a pair of upper basket tabs 14e may be positioned proximate to top corners of the back wall and may extend away from the side walls. Similarly, a pair of lower basket tabs 14f may be positioned proximate to bottom corner of the back wall and may extend away from the side walls.

Figure 2A:
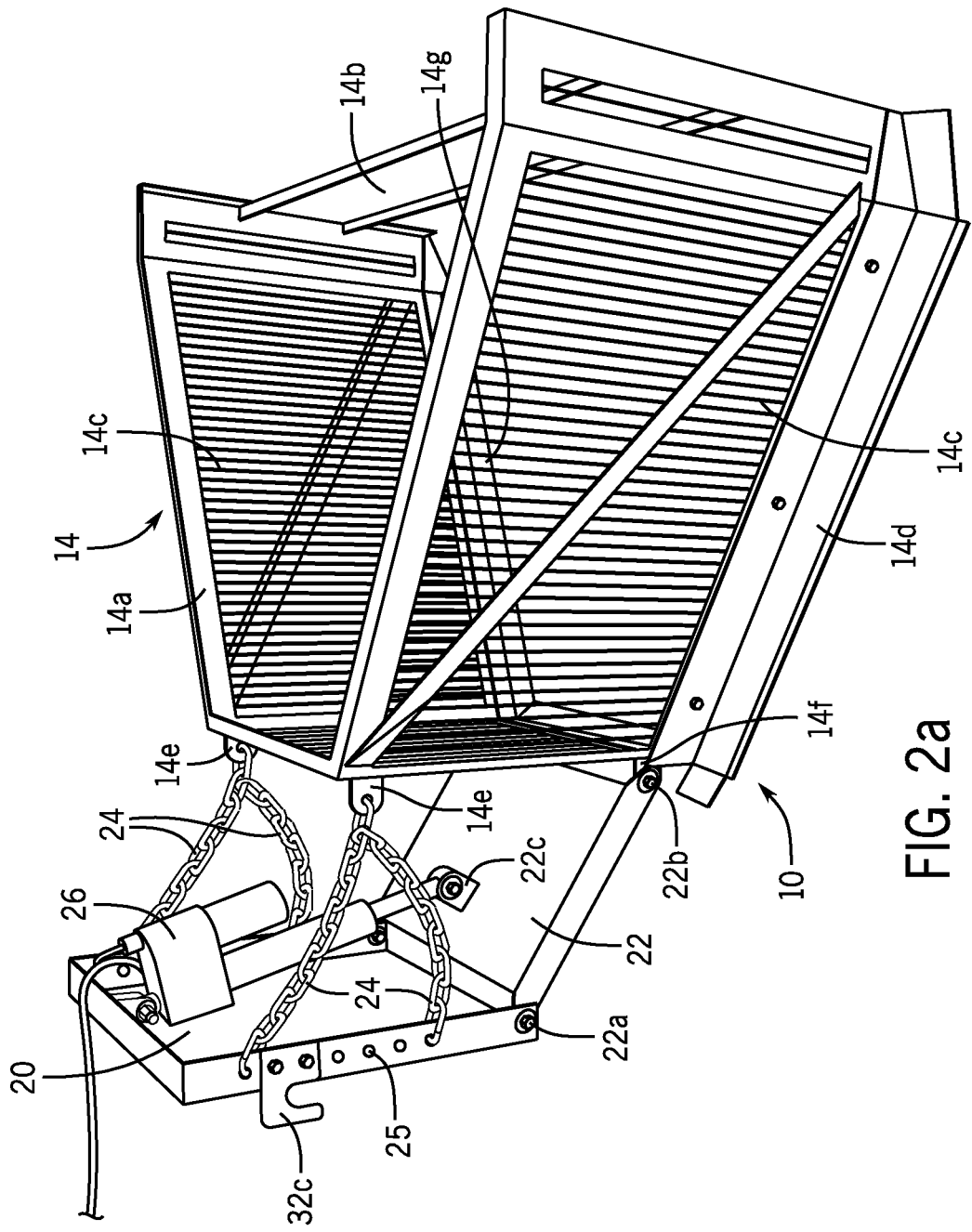
FIG. 2A is a perspective view of one embodiment of the present disclosure.

As mentioned above, the basket 14 may be attached to a ridable device. For example, the basket 14 may attach to a front portion of the ridable device, such as to the front bumper. In such cases, and as shown in FIG. 2a, the harvesting machine 10 may further comprise a vertical bumper plate 20 designed to removably engage with the bumper. For example, the vertical bumper plate 20 may be substantially rectangular in shape, wherein two side edges of the vertical bumper plate 20 may comprise a plurality of adjustment orifices 25 extending therethrough. A bumper mount tab 32c may be designed to removably engage with the adjustment orifices 25 to provide a bumper attachment mechanism. As shown in the Figures, the bumper mount tab 32c may comprise a hooked tab designed to removably engage with the bumper by, for example, simply hooking over the front grill on, for example, an ATV.

In the case of ridable devices that do not include a bumper or other structure with which the bumper mount tab 32c could easily engage, the harvesting machine may further comprise a vertical bumper plate unit 18 designed to engage with tractor mounts 16, which may be positioned between the wheels 11, on a tractor 12. The vertical bumper plate unit 18 may include a triangular shaped spacer designed to attach to the tractor mount 16 and a vertical plate portion designed to removably engage with the vertical bumper plate 20, wherein sides of the vertical plate portion may include protrusions extending therefrom—a first proximate to a top surface of the vertical plate portion and a second proximate to the bottom surface of the vertical plate portion, wherein an upper bumper mounting tab 32b extends from the vertical bumper plate 20 and engages with the first protrusion and a lower bumper mounting tab 32a extends from the vertical bumper plate 20 and engages with the second protrusion. While the above describes exemplary attachment structures for attaching the basket 14 to a ridable device, other attachment structures are also envisioned.

Figure 3:
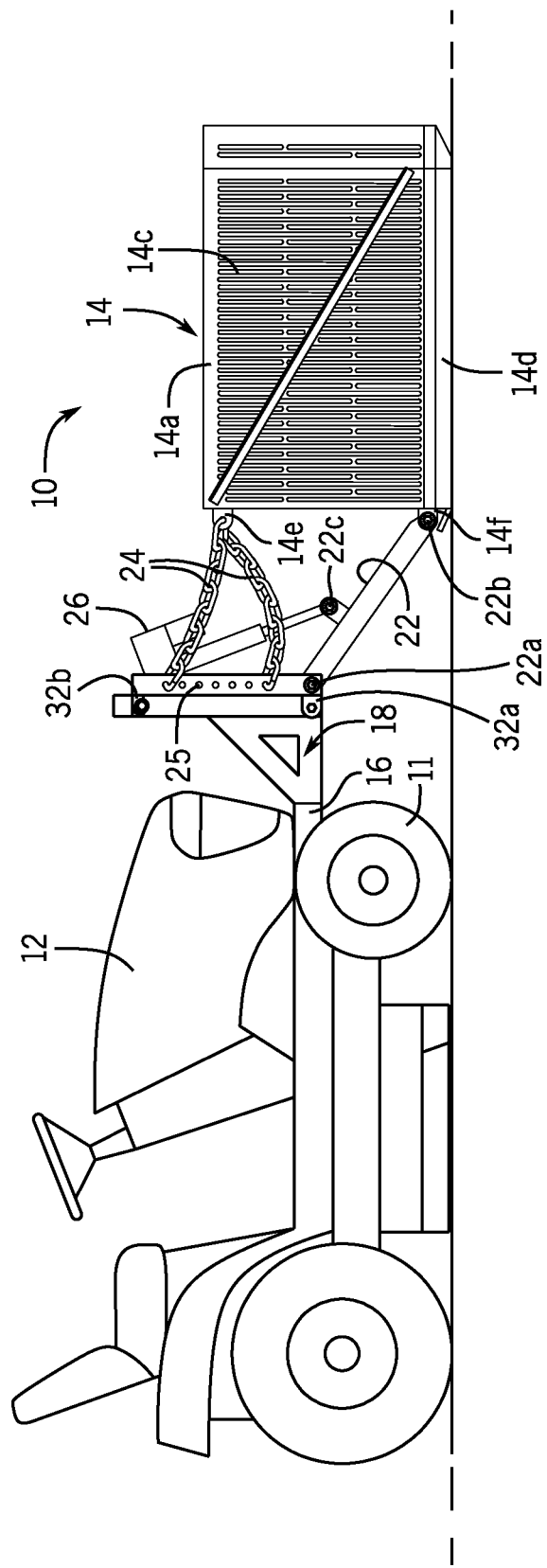
FIG. 3 is a side elevation view of one embodiment of the present disclosure.
Figure 4:
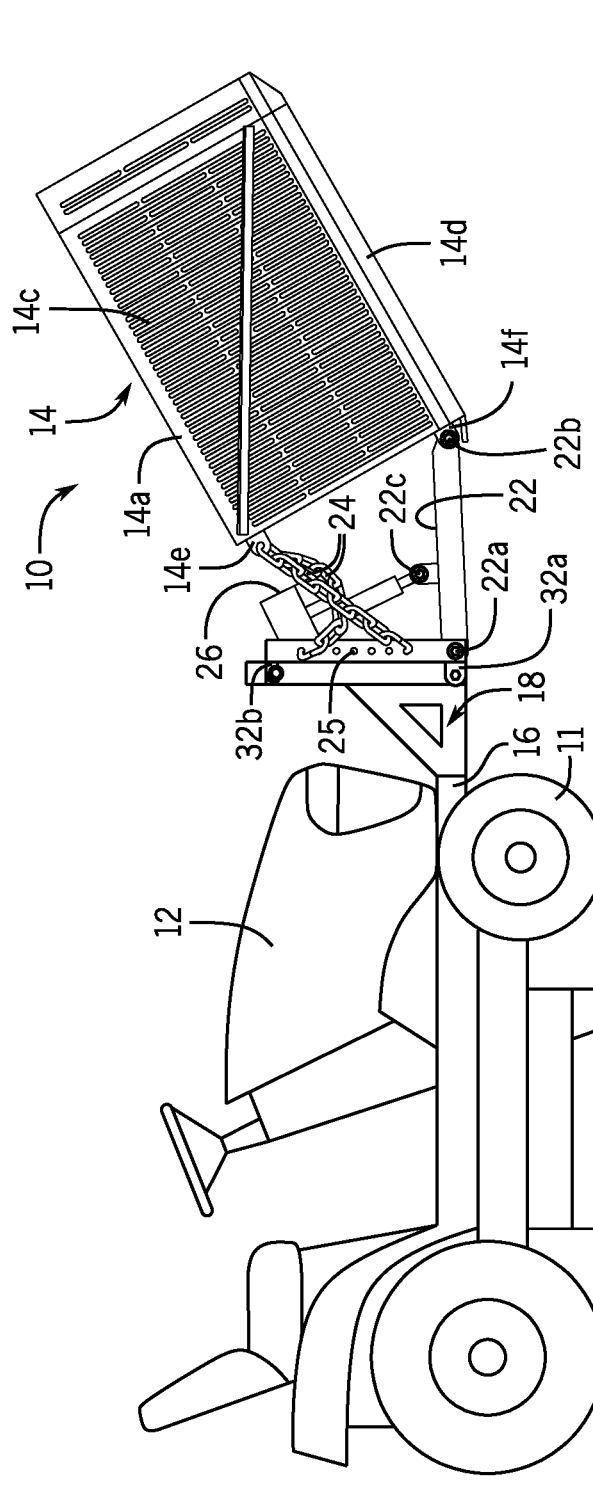
FIG. 4 is a side elevation view of one embodiment of the present disclosure.

In either case, the vertical bumper plate 20 may have a lift plate 22 pivotably attached to a lower edge thereof via a first plate pivot 22a, wherein an end of the lift plate 22 distal from the vertical bumper plate 20 may be pivotably attached to a bottom portion of the back wall of the basket 14 via a second plate pivot 22b. An actuator, such as a linear actuator 26 may be attached to a central portion of the lift plate 22 and to a central top portion of the vertical bumper plate 20. For example, the first end of the linear actuator 26 may comprise a first actuator pivot 28a engaged with a plate clevis 22c extending upward from the lift plate 22, and a second end of the linear actuator 26 may comprise a second actuator pivot 28b engaged with a bumper plate clevis 30b. The linear actuator 26 may be any conventional linear actuator 26 designed to create motion in a straight line and may be operatively connected to a control mechanism, such as knobs, buttons, levers, and the like, positioned proximate to the user. Thus, as the linear actuator 26 is engaged, the movement of the actuator 26 may cause the lift plate 22 and, as a result, the basket 14, to move up and down, as shown in FIGS. 3 and 4.

The harvesting machine may further comprise a first and second chain 24 attaching a top portion of the basket 14 to the vertical bumper plate 20. For example, a first end of each chain 24 may be attached to an upper adjustment orifice 25, a central portion of the chain 24 may extend through an orifice in the upper basket tab 14e, and a second end of the chain 14 may be attached to a lower adjustment orifice 25. In embodiments, he upper chain may allow for the basket 14 to float with terrain when in the lowest position, while the lower chain may allow the basket 14 to title back when fully lifted.

Figure 5:
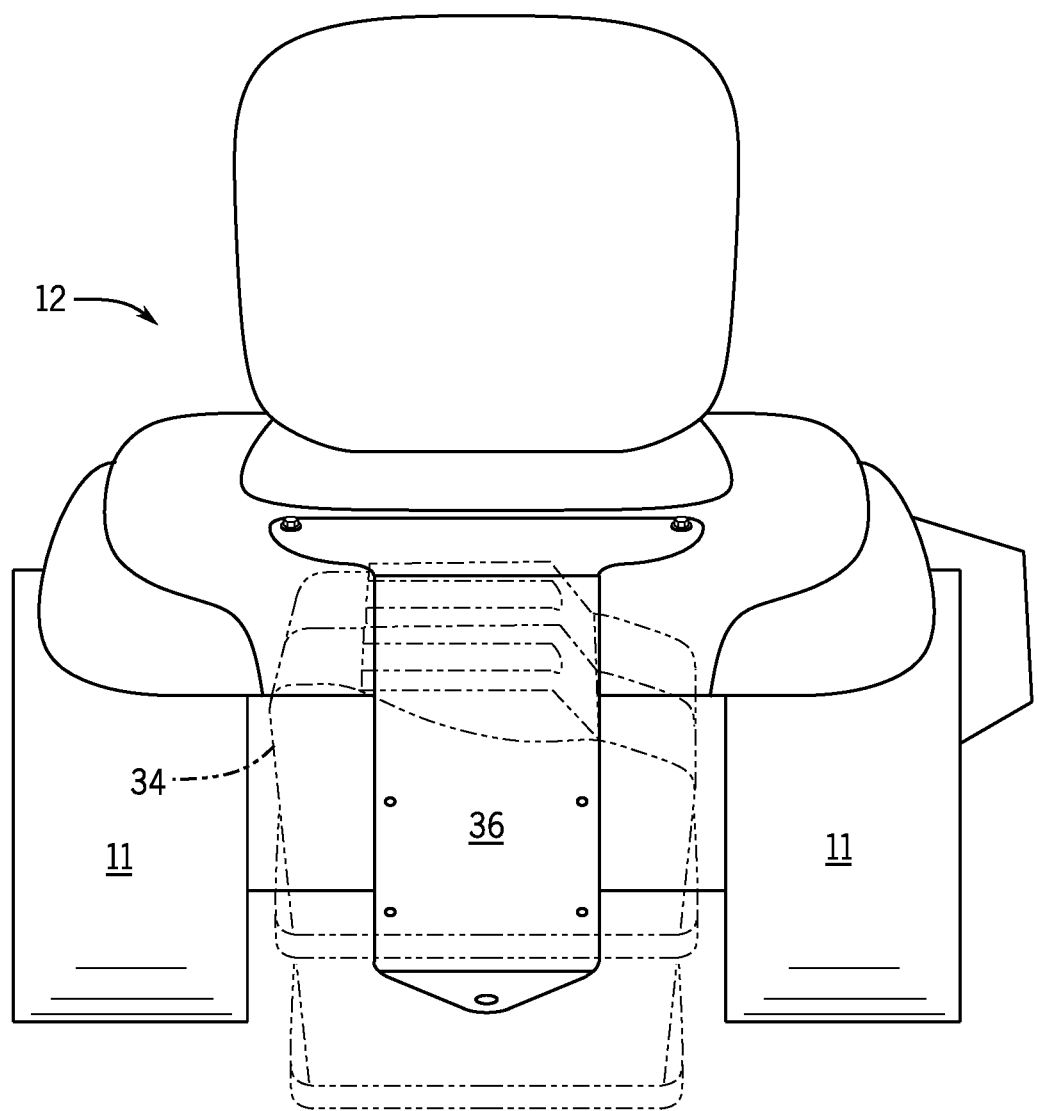
FIG. 5 is a rear elevation view of one embodiment of the present disclosure.

Some embodiments of the device of the present disclose may comprise a harvesting equipment kit comprising the harvesting machine 10 described above and designed to removably attach to the front of a ridable device and a fuel tank mounting plate 36, as shown in FIG. 5, designed to attach to another area of the ridable device, such as to a back surface of the fuel tank mounting plate 36. The fuel tank mounting plate 36 may be designed to secure at least one portable fuel tank 34 to the ridable device, such as a tractor 12.

The components of the device of the present disclosure may be assembled and manufactured using any suitable methods and, in some embodiments, includes welding and bolting or otherwise fastening parts together. Additionally, the components may be made of any suitable material. For example, the components may comprise steel.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A harvesting machine designed to push ends of nut rows in after sweeping, the machine comprising:
   a bottomless basket removably attached to a ridable device, and
   a linear actuator operatively attached to the bottomless basket, allowing the bottomless basket to move vertically up and down off of a ground surface,
   wherein:
      the bottomless basket comprises:
         a back wall;
         a first side wall attached to a first edge of the back wall;
         a second side wall attached to a second edge of the back wall distal from the first edge of the back wall, wherein the first side wall and the second side wall extend outwardly from the back wall, each at an angle, such that first ends of each side wall attached to the back wall are closer together than second ends of each side wall positioned distal from the back wall; and
         a cross support attached to and extending between the second ends of the side walls;
      the machine further comprises:
         a pair of upper basket tabs positioned proximate to top corners of the back wall and extending away from the side walls;
         a pair of lower basket tabs positioned proximate to bottom corners of the back wall and extending away from the side walls;
         a lift plate pivotably attached to the pair of lower basket tabs; and
         a vertical bumper plate pivotably attached to an edge of the lift plate distal from the pair of lower basket tabs, the vertical bumper plate removably attached to the ridable device;
      a first end of the linear actuator is attached to the vertical bumper plate; and
      a second end of the linear actuator is attached to the lift plate.

2. The harvesting machine of claim 1, wherein the cross support is attached to the second ends of the side walls at a height such that it is spaced vertically above the ground surface when the bottomless basket is sitting on the ground surface.

3. The harvesting machine of claim 1, further comprising a skid shoe attached to a bottom edge of the back wall and each of the side walls.

4. The harvesting machine of claim 1, wherein the back wall, the first side wall, and the second side wall each comprise slotted sides.

5. The harvesting machine of claim 1, wherein:
- two side edges of the vertical bumper plate comprise a plurality of adjustment orifices extending therethrough; and
- a bumper mount tab is removably engaged with the adjustment orifices, the bumper mount tab comprising a hooked tab designed to removably engage with a bumper on the ridable device.

6. The harvesting machine of claim 1, further comprising:
- a vertical bumper plate unit attached to the vertical bumper plate; and
- a tractor mount attached to the ridable device and to the vertical bumper plate unit.

7. The harvesting machine of claim 6, wherein:
- an upper bumper mounting tab is attached to and extending from a top corner of the vertical bumper plate;
- a lower bumper mounting tab is attached to and extending from a bottom corner of the vertical bumper plate; and
- the upper bumper mounting tab and the lower bumper mounting tab are each designed to engage with a corresponding protrusion on the vertical bumper plate unit.

8. The harvesting machine of claim 1, further comprising at least one chain attached to the vertical bumper plate and the pair of upper basket tabs.

* * * * *